(12) United States Patent
Elgousi et al.

(10) Patent No.: US 7,975,158 B2
(45) Date of Patent: Jul. 5, 2011

(54) NOISE REDUCTION METHOD BY IMPLEMENTING CERTAIN PORT-TO-PORT DELAY

(75) Inventors: Muhammed Elgousi, Tempe, AZ (US);
Jayashree Kar, Saratoga, CA (US);
David G. Figueroa, Avondale, AZ (US);
Srikrishnan Venkataraman, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 480 days.

(21) Appl. No.: 11/967,726

(22) Filed: Dec. 31, 2007

(65) Prior Publication Data

US 2009/0259787 A1 Oct. 15, 2009

(51) Int. Cl.
*G06F 1/00* (2006.01)

(52) U.S. Cl. ........................................ 713/330; 713/300

(58) Field of Classification Search .................. 713/300, 713/330; 324/613
See application file for complete search history.

(56) References Cited

U.S. PATENT DOCUMENTS

| 4,475,172 | A | * | 10/1984 | Frederiksen | 345/440 |
|---|---|---|---|---|---|
| 6,009,488 | A | | 12/1999 | Kavipurapu | |
| 6,566,903 | B1 | * | 5/2003 | Mandal et al. | 326/30 |
| 6,650,575 | B1 | * | 11/2003 | Khanna | 365/194 |
| 2007/0140397 | A1 | | 6/2007 | Jaussi | |
| 2007/0150197 | A1 | | 6/2007 | Venkataraman | |
| 2007/0295818 | A1 | | 12/2007 | Li | |
| 2009/0248945 | A1 | * | 10/2009 | Navaratnam et al. | 710/316 |

* cited by examiner

*Primary Examiner* — Mark Connolly
(74) *Attorney, Agent, or Firm* — David L. Guglielmi

(57) ABSTRACT

A noise reduction method by implementing certain point-to-point delay is disclosed. In this regard a method is introduced comprising determining a frequency of a greatest noise on a high-speed data link when turning on a power delivery network, determining a delay time between a first port and a second port that minimizes the greatest noise, and turning on the second port after the delay time from turning on the first port. Other embodiments are also disclosed and claimed.

14 Claims, 4 Drawing Sheets

NOISE REDUCTION METHOD BY IMPLEMENTING CERTAIN PORT-TO-PORT DELAY

BACKGROUND

In a high speed interface such as for example a PCI-E (peripheral components interconnect—express), CSI (common system interface), FBD (fully buffered DIMM) etc, there may be an AC (alternate current) noise caused by a total effective load di/dt (change in current/change in time) that is instantaneous sum of individual lane load and may be sensed by the I/O power supply network. Each lane of an I/O interface may have a transmitter, a receiver and other digital circuits. Each individual lane may generate a lane load. The power supply network may sense an impact of the total effective load of all the operational lanes and may exhibit the AC noise.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other stances, well known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, elements referred to herein with a common reference label followed by a particular number may be collectively referred to by the reference label alone. For example, lanes 200A, 200B, 200C . . . 200N may be collectively referred to as lanes 200. Similarly delay circuits 210A, 210B . . . 210N may be collectively referred as delays 210.

Figure 1:
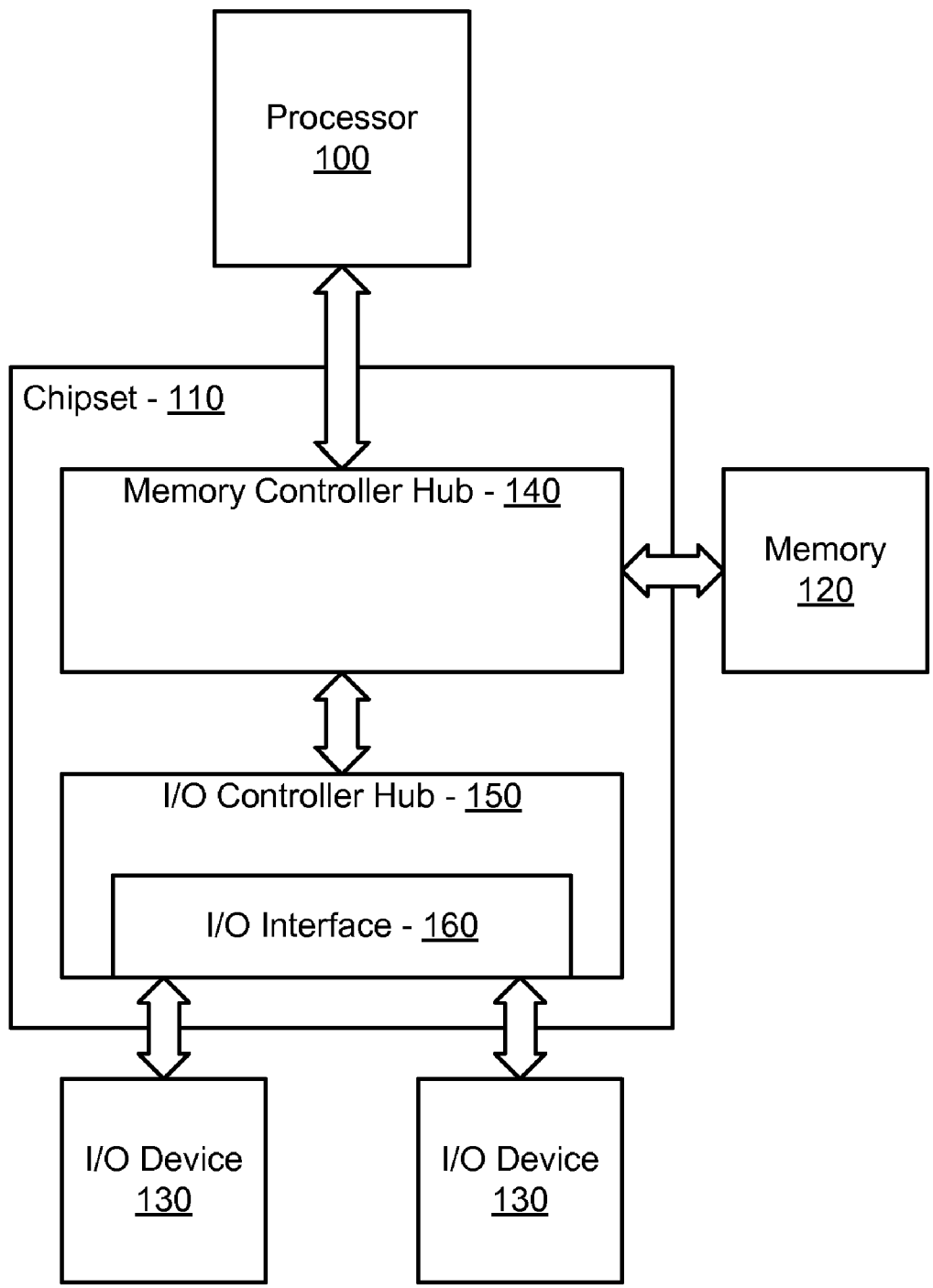
FIG. 1 illustrates an embodiment of a computer system.

Referring to FIG. 1, an embodiment of a computer system is shown. The computer system may include a processor 100, a chipset 110, a memory 120, and I/O (input/output) devices 130. As depicted, the processor 100 may be coupled with the chipset 110 via a processor bus. The memory 120 may be coupled with the chipset 110 via a memory bus. The I/O devices 130 may be coupled with the chipset 110 via an I/O bus such as, for example, PCI (Peripheral Component Interconnect) buses, PCI Express buses, USB (Universal Serial Bus) buses, SATA (Serial Advanced Technology Attachment) buses, etc.

The processor 100 may be implemented with an Intel® Pentium® 4 processor, Intel® Pentium® M processor, and/or another type of general purpose processor 100 capable of executing software and/or firmware instructions. In one embodiment, the processor 100 may execute instructions stored in the memory 120 to perform various tasks and to control the overall operation of the computer system. The processor 100 may also execute instructions and/or routines related to power management such as, causing a component such as an I/O interface to reduce AC noise during operation of the system.

The chipset 110 may comprise one or more integrated circuits or chips to couple the processors 100 with other components of the computer system. As depicted, the chipset 110 may comprise a memory controller hub (MCH) 140 and an I/O controller hub (ICH) 150. The memory controller hub 140 may provide an interface to memory devices of the memory 120. In particular, the memory controller hub 140 may generate signals on the memory bus to read and/or write data to memory devices of the memory 120 in response to requests from the processor 100 and I/O devices 130. The memory 120 may comprise for example RAM (Random Access Memory) devices such as source synchronous dynamic RAM devices and DDR (Double Data Rate) RAM devices.

The I/O controller hub 150 according to an embodiment may comprise an I/O interface 160 such as, for example, a PCI Express interface. The I/O interface 160 may interface the I/O devices 130 with the I/O controller hub 150, thus permitting data transfers between the processor 100 and the I/O devices 130 and between the memory 120 and the I/O devices 130. In one embodiment the I/O interface 160 may be present in processor 100 or in memory controller hub 140.

As depicted, the computer system may also comprise I/O devices 130. The I/O device 130 may implement various input/output functions for the computer system. For example, the I/O device 130 may comprise hard disk drives, keyboards, mice, CD (compact disc) drives, DVD (digital video discs) drives, printers, scanners, etc.

Figure 2:
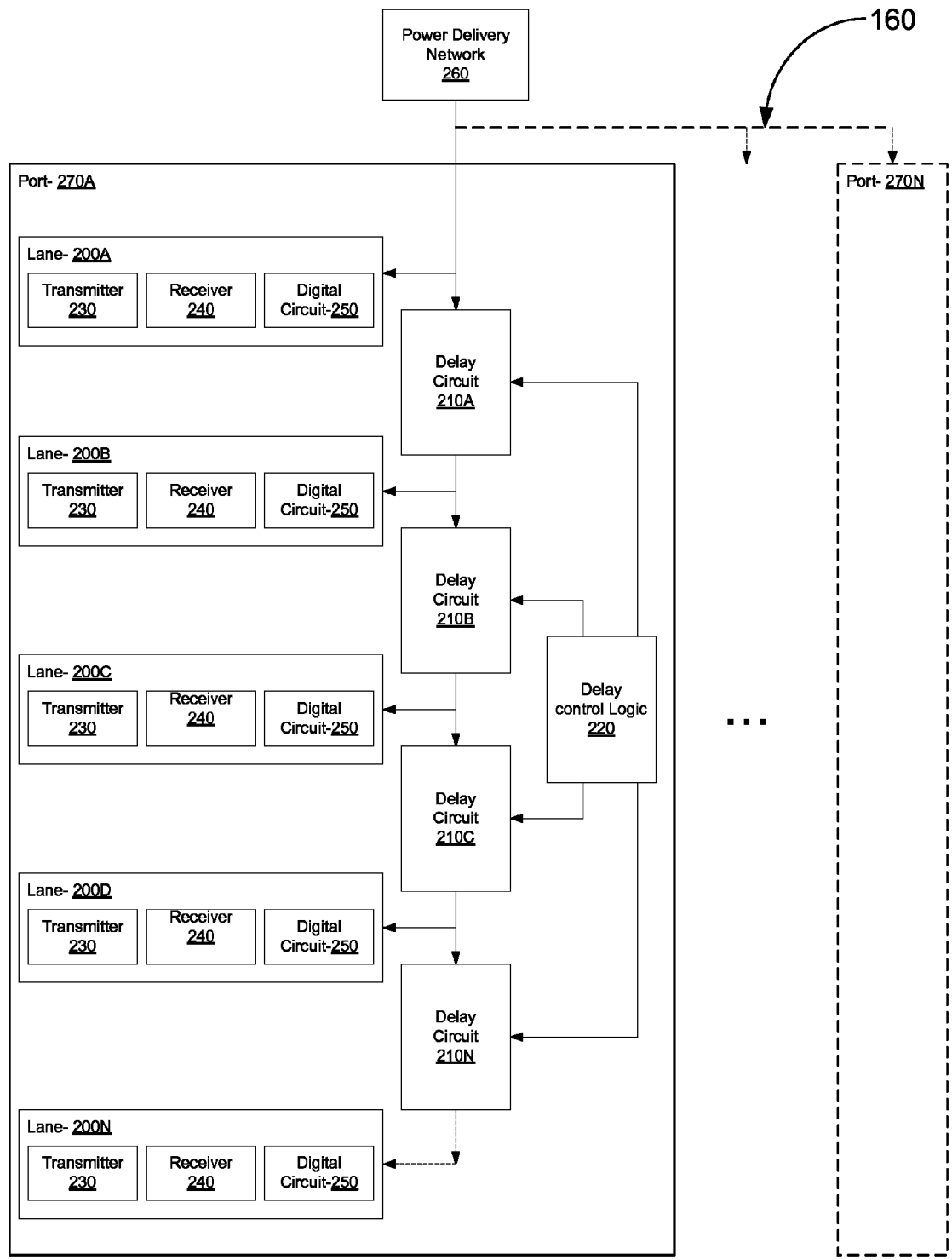
FIG. 2 illustrates an embodiment of an I/O interface system.

Referring to FIG. 2, an embodiment of an I/O interface system 160 is shown. As depicted the I/O interface system 160 may comprise a plurality of ports 270 including a plurality of lanes 200 such as for example 200A, 200B, 200C . . . 200N, a plurality of delay circuits 210 such as for example 210A, 210B, 210C . . . 210N, a delay control logic 220 and a power delivery network 260. The lane 200A may be coupled to the lane 200 B through a delay circuit 210A provided between the lanes 200 A-200 B and lane 200 B may be coupled to the lane 200 C through another delay circuit 210 B provided between the lanes 200B and 200C and so on up to lane 200N having a delay circuit 210N between the adjoining lanes 200. The delay control logic 220 may be coupled to each delay circuit 210A-210N.

As depicted each lane of the lanes 200, in one embodiment, may comprise a transmitter 230, a receiver 240 and a digital circuit 250. When the power is supplied by power delivery network 260 to the ports 270 of I/O system all the lanes 200, may be switched-on simultaneously and due to transmitter 230, receiver 240, and digital circuit 250 in the lanes 200, each lane 200A-200N may contribute a lane load on the power supply network. Power delivery network 260 may sense an impact of total effective load di/dt (instantaneous sum of all the individual lane loads) of all the operational lanes 200 and generates an AC noise during operation of the I/O system. The delay circuits 210 may introduce a time delay between the lanes 200 to delay the switching-on of the subsequent lanes 200. In one embodiment the delay time/time constant in the delay circuits 210 may be controlled with the help of the delay control logic 220 by varying the voltage in the delay circuits 210.

Figure 3:
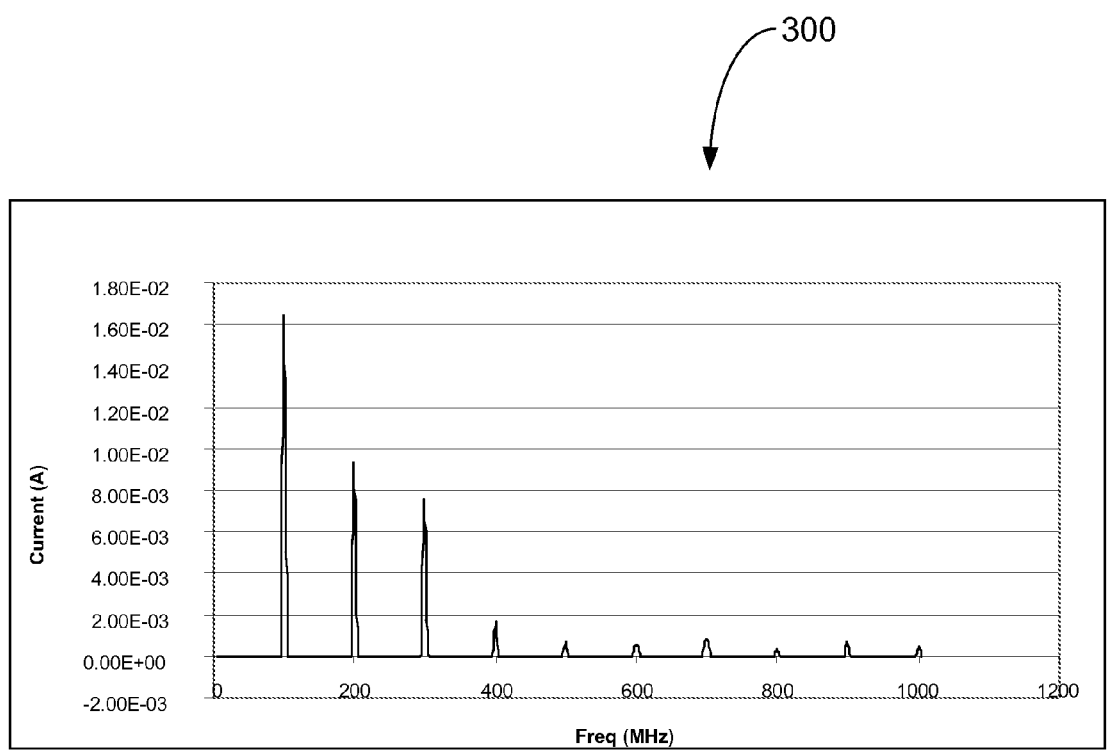
FIG. 3 illustrates an embodiment of noise graph.

In one embodiment to calculate programmed delay time, a frequency is determined, through experimentation, which contributes the most noise to I/O interface 160 when a lane 200 of a port 270 is turned on. In one example, a noise graph such as depicted in FIG. 3 is measured from lane 200A of port 270A to determine the frequency with the greatest noise contribution. Based on this frequency a delay time may be determined to minimize noise at this frequency by turning on successive lanes so that the ports are 180 degrees out of phase at this frequency. In one embodiment, this frequency is referred to as a resonant frequency of power delivery network 260. In the case where this frequency is 100 MHz, the delay time would be half the period or 5 ns. If the I/O interface operates at 6.4 GHz, this delay time would amount to 32 unit intervals (UI).

In one embodiment, there may be an intrinsic delay between lanes and delay control logic 220 may add such additional delay to the intrinsic delay to achieve the calculated delay time. Delay circuits 210 may also delay the turning off of each lane of each port, for example as part of a power savings scheme. Delay control logic 220 may supply a second delay time to delay circuits 210 for turning off each successive lane that may or may not be different than the delay time for turning on each successive lane.

In one embodiment, by introducing the programmed delay circuits 210 between the lanes 200, individual lane loads may be spaced uniformly to reduce an overlapping and alignment of the loads in the lanes 200. Thus total effective load (instantaneous sum of all the individual lane loads) sensed by power delivery network 260 may be reduced substantially and the reduction in the total effective load may result in smaller AC peak to peak noise in the I/O system.

Referring now to FIG. 3, one embodiment of a noise graph is illustrated. As depicted, plot 300 shows the current measurements of different frequency components on a lane being turned on. In this example, 100 MHz is the frequency of the greatest noise. In one embodiment, plot 300 is measured at lane 200A.

Figure 4:
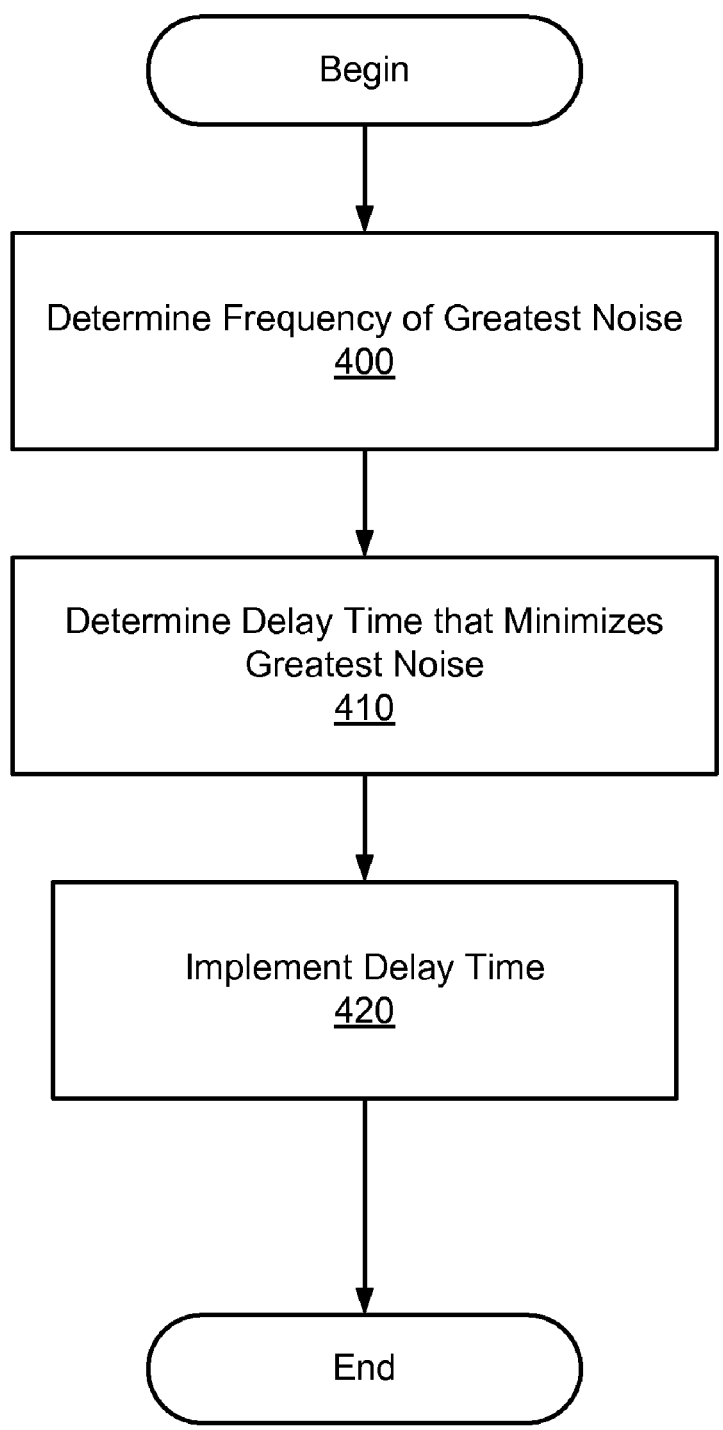
FIG. 4 illustrates an embodiment of a noise reduction method that may be implemented by the system of FIG. 1.

Referring now to FIG. 4, an embodiment of a noise reduction method implementable by the system of FIG. 1 is illustrated. As depicted in block 400, a frequency of greatest noise is determined. In one embodiment, a noise graph, such as depicted in FIG. 3 is obtained to visually determine which frequency contributes the greatest noise on a lane 200 while being turned on.

In block 410, a delay time is determined that minimizes the greatest noise. In one embodiment, the delay time half the period of the frequency determined in block 400.

In block 420, as depicted, the delay time is implemented in I/O interface 160. In one embodiment, delay control logic 220 is configured to store the appropriate delay time for use in delay control circuits 210.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
   determining a frequency of a greatest noise on a high-speed data link when turning on a power delivery network;
   determining a delay time between a first port and a second port that minimizes the greatest noise; and
   turning on the second port after the delay time from turning on the first port.

2. The method of claim 1, wherein determining the frequency of the greatest noise comprises determining a resonant frequency of the power delivery network.

3. The method of claim 1, wherein the frequency is about 100 megahertz (MHz).

4. The method of claim 1, wherein the delay time is about 32 unit intervals.

5. The method of claim 1, further comprising turning on a third port after the delay time from turning on the second port.

6. The method of claim 1, further comprising turning off the second port after the delay time from turning off the first port.

7. An I/O interface comprising
   a plurality of lanes to be switched on;
   a delay circuit to provide a programmed delay between the lanes to switch-on successive lanes after the programmed delay; and
   a delay control logic to control the time delay in the delay circuit, wherein the delay time is determined to minimize a greatest noise on a lane when turning on a power delivery network, wherein the delay time is half a period of a frequency of the greatest noise.

8. The I/O interface of claim 7, wherein the highest noise occurs at a resonant frequency of the power delivery network.

9. The I/O interface of claim 7, further comprising the delay circuit to provide a second programmed delay between the lanes to switch-off successive lanes after the second programmed delay.

10. The I/O interface of claim 9, wherein the first and second programmed delays are substantially the same.

11. A system comprising
    a processor;
    a chipset to facilitate I/O signal to be transmitted to a computer system;
    I/O devices to provide instructions to the computer system; and
    I/O interfaces to couple the I/O devices with the chipset to provide a programmed delay between the lanes to switch-on successive lanes after the programmed delay, wherein the programmed delay is determined to minimize a greatest noise on a lane when turning on a power delivery network, wherein the programmed delay is half a period of a frequency of the greatest noise.

12. The system of claim 11, wherein the highest noise occurs at a resonant frequency of the power delivery network.

13. The system of claim 11, further comprising the I/O interfaces to provide a second programmed delay between the lanes to switch-off successive lanes after the second programmed delay.

14. The system of claim 13, wherein the first and second programmed delays are substantially the same.

* * * * *